(12) United States Patent
Yamashita et al.

(10) Patent No.: US 9,739,245 B2
(45) Date of Patent: Aug. 22, 2017

(54) RESONATOR STRUCTURE OF SADDLE-RIDE VEHICLE, AND SADDLE-RIDE VEHICLE

(71) Applicant: HONDA MOTOR CO., LTD., Minato-Ku, Tokyo (JP)

(72) Inventors: Akihiro Yamashita, Wako (JP); Yuzuru Ishikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/239,094

(22) Filed: Aug. 17, 2016

(65) Prior Publication Data

US 2017/0089308 A1 Mar. 30, 2017

(30) Foreign Application Priority Data

Sep. 28, 2015 (JP) ................................ 2015-189078

(51) Int. Cl.
*F02M 35/12* (2006.01)
*B62M 7/02* (2006.01)

(52) U.S. Cl.
CPC .......... *F02M 35/1255* (2013.01); *B62M 7/02* (2013.01)

(58) Field of Classification Search
CPC ............................. F02M 35/1255; B62M 7/02
USPC ........................................................ 181/229
See application file for complete search history.

(56) References Cited

U.S. PATENT DOCUMENTS 6,409,783 B1 * 6/2002 Miyajima .............. F02M 35/04
123/198 E
6,422,332 B1 * 7/2002 Takata ..................... F02B 61/02
123/41.01
7,264,072 B2 * 9/2007 Yoshikawa ............ F02M 35/04
123/184.21
7,270,207 B2 * 9/2007 Idei ......................... F02B 61/02
180/219
7,380,624 B2 * 6/2008 Momosaki ....... F02M 35/10013
180/68.3
7,748,746 B2 * 7/2010 Beiber Hoeve .......... B62J 35/00
180/219
8,122,990 B2 * 2/2012 Suzuki ................... B60K 11/04
180/218
9,370,996 B2 * 6/2016 Kawata .................. B60K 13/02
2006/0219201 A1 * 10/2006 Seki ................. F02M 35/10013
123/184.55
2007/0144802 A1 * 6/2007 Tsuya ..................... B62K 11/04
180/68.2
2007/0149105 A1 * 6/2007 Nakagome ............... B62J 17/02
454/136

(Continued)

FOREIGN PATENT DOCUMENTS

JP 2010-127076 A 6/2010

*Primary Examiner* — Jeremy Luks
(74) *Attorney, Agent, or Firm* — Carrier Blackman & Associates, P.C.; William D. Blackman; Anne G. Sabourin

(57) ABSTRACT

A resonator structure of a saddle-ride vehicle includes a head box that includes a head pipe defining a handlebar steering axis and that forms an intake passage through which air is guided from a front of the vehicle into an inside of the vehicle when the vehicle is traveling, an air cleaner box that is connected to the head box and allows the air guided through the intake passage to be taken into a power unit of the vehicle, and a resonator that forms a resonator chamber configured to reduce an air intake noise. The resonator chamber is formed continuous to the intake passage inside the head box.

17 Claims, 11 Drawing Sheets

(56) References Cited

U.S. PATENT DOCUMENTS

| | | | |
|---|---|---|---|
| 2010/0071991 A1* | 3/2010 | Ono | F02M 35/10144 181/229 |
| 2013/0306391 A1* | 11/2013 | Kontani | B62K 11/00 180/219 |
| 2014/0090912 A1* | 4/2014 | Kontani | B62K 11/00 180/68.3 |
| 2015/0027797 A1 | 1/2015 | Miki et al. | |

* cited by examiner

RESONATOR STRUCTURE OF SADDLE-RIDE VEHICLE, AND SADDLE-RIDE VEHICLE

CROSS-REFERENCE TO RELATED APPLICATIONS

The present invention claims priority under 35 USC 119 based on Japanese patent application No. 2015-189078, filed on Sep. 28, 2015. The entire subject matter of this priority document, including specification claims and drawings thereof, is incorporated by reference herein.

BACKGROUND OF THE INVENTION

1. Field of the Invention

The present invention relates to a resonator structure of a saddle-ride vehicle.

2. Background Art

Conventionally, there has been a saddle-ride vehicle disclosed in Japanese Patent Application Publication No. 2010-127076, for example. In this saddle-ride vehicle, a resonator for reducing an intake noise is disposed in a space (dead space) located at the left of a duct part forming an intake passage inside and located between the duct part and a left headlight.

Problems to be Solved by the Invention

However, since such a saddle-ride vehicle requires a space for disposing the resonator to be reserved outside the duct part, a front portion of the vehicle becomes large in size. This imposes a limitation on the size reduction of the front portion of the vehicle body. In addition, a volume of the resonator needs to be large to some extent for obtaining a silencing effect of the resonator. In other words, a sufficient silencing effect cannot be obtained if the volume of the resonator is too small. For this reason, it is a desideratum in the art to reduce the size of the front portion of the vehicle body while enhancing the silencing effect of the resonator.

SUMMARY OF THE INVENTION

An object of the present invention is to provide a resonator structure of a saddle-ride vehicle including a resonator that forms a resonator chamber for reducing an intake noise, the resonator structure achieving size reduction of the front portion of the vehicle body while enhancing the silencing effect of the resonator.

For the purpose of solving the above-mentioned limitations of the Background Art, according to a first aspect of the present invention there is provided a resonator structure of a saddle-ride vehicle including: a head box (20) that includes a head pipe (21) forming a handlebar steering axis (C1) and forms an intake passage (20s) through which air is guided from a front of the vehicle into an inside of the vehicle when the vehicle is travelling; an air cleaner box (40) that is connected to the head box (20) and allows the air guided through the intake passage to be taken into a power unit (10) of the vehicle; and a resonator (23) that forms a resonator chamber (23s) configured to reduce an air intake noise, wherein the resonator chamber (23s) is formed continuous to the intake passage (20s) inside the head box (20).

According to a second aspect of the present invention, the resonator (23) is integrally molded with the head box (20) as a single member.

According to a third aspect of the present invention, the head box (20) is provided with a partition (23w) between the resonator chamber (23s) and the intake passage (20s), the partition (23w) separating the resonator chamber (23s) and the intake passage (20s), and a communication hole (23h) through which the resonator chamber (23s) and the intake passage (20s) communicate is formed in the partition (23w).

According to a fourth aspect of the present invention, the air cleaner box (40) is disposed at a rear side of the head box (20), a pair of left and right intake holes (41h) are provided at a front portion of the air cleaner box (40), and the pair of left and right intake holes (41h) are disposed rearward of the communication hole (23h).

According to a fifth aspect of the present invention, the resonator (23) is disposed at each of left and right sides of the head box (20).

According to a sixth aspect of the present invention, an upper-lower length (H2) of the resonator (23) is shorter than an upper-lower length (H1) of the head pipe (21) in a direction along the handlebar steering axis (C1).

According to a seventh aspect of the present invention, the resonator (23) forms an inner wall (20f) of the head box (20) and an outer wall (21f) of the head pipe (21)

Effects of the Invention

According to the first aspect of the present invention, since the resonator chamber is formed inside the head box continuous to the intake passage, it is possible to effectively use the space inside the main frame. Thus, since there is no need to reserve a space for disposing the resonator outside the head box, the size of the front portion of the vehicle body can be reduced unlike the case where the resonator is disposed outside the head box. In addition, it is easier to secure a sufficiently large volume of the resonator compared to a case where the resonator is disposed outside the head box, and it is correspondingly easier to obtain a sufficient silencing effect of the resonator. Accordingly, it is possible to reduce the size of the front portion of the vehicle body while enhancing the silencing effect of the resonator.

According to the second aspect of the present invention, the resonator is integrally molded with the head box as a single member. Thus, compared to a case where the resonator is molded separately from the head box (for example, the case where the resonator is formed as a separate component and mechanically joined to the head box), the resonator and head box can be joined seamlessly and an interface (surface) therebetween becomes smooth. For this reason, the resonator chamber can be formed accurately inside the head box. For example, in a case where the head box is molded by forging, any unnecessary portion such as a burr is not generated, unlike a technique such as welding which does form such an unnecessary portion. Therefore, time and effort to remove the unnecessary portion can be eliminated. In addition, metal which is a material for forging has a lower thermal expansion rate than resin which is a material for blow molding. Therefore, it is easy to form the resonator chamber accurately inside the head box.

According to the third aspect of the present invention, the communication hole through which the resonator chamber and the intake passage communicate is formed in the partition. This enables smooth communication between the resonator chamber and the intake passage. Therefore, it is possible to prevent an intake resistance between the resonator chamber and the intake passage from increasing.

According to the fourth aspect of the present invention, each of the pair of left and right intake holes is disposed rearward of the communication hole. Thus, the air filled in the resonator chamber is smoothly guided into the air cleaner box through the pair of left and right intake holes. Therefore, the air can be supplied to the power unit by effectively using the air filled in the resonator chamber. Accordingly, it is possible to prevent the intake resistance from increasing at the moment the engine rotation speed shifts to a high rotation speed region.

According to the fifth aspect of the present invention, the resonator is disposed at each of the left and right sides of the head box. Thus, the resonator chambers inside the head box can have a larger volume than in the case where the resonator is disposed at only one side, left or right, of the head box. Therefore, the silencing effect for the intake noise can be enhanced. In addition, a rigidity balance of the left and right main frames including the head box can be improved.

According to the sixth aspect of the present invention, the upper-lower length of the resonator is shorter than the upper-lower length of the head pipe in the direction along the handlebar steering axis. Thus, it is possible to make a structure in which the resonator does not protrude upward or downward from the head pipe. Therefore, the resonator chamber can be compactly formed inside the head box, and the size of the front portion of the vehicle body can be reduced.

According to the seventh aspect of the present invention, the resonator forms the inner wall of the head box and the outer wall of the head pipe. Thus, the volume of the resonator chamber can be increased as large as reasonably possible, and the silencing effect for the intake noise can be enhanced.

DETAILED DESCRIPTION OF MODES FOR CARRYING OUT THE INVENTION

Figure 1:
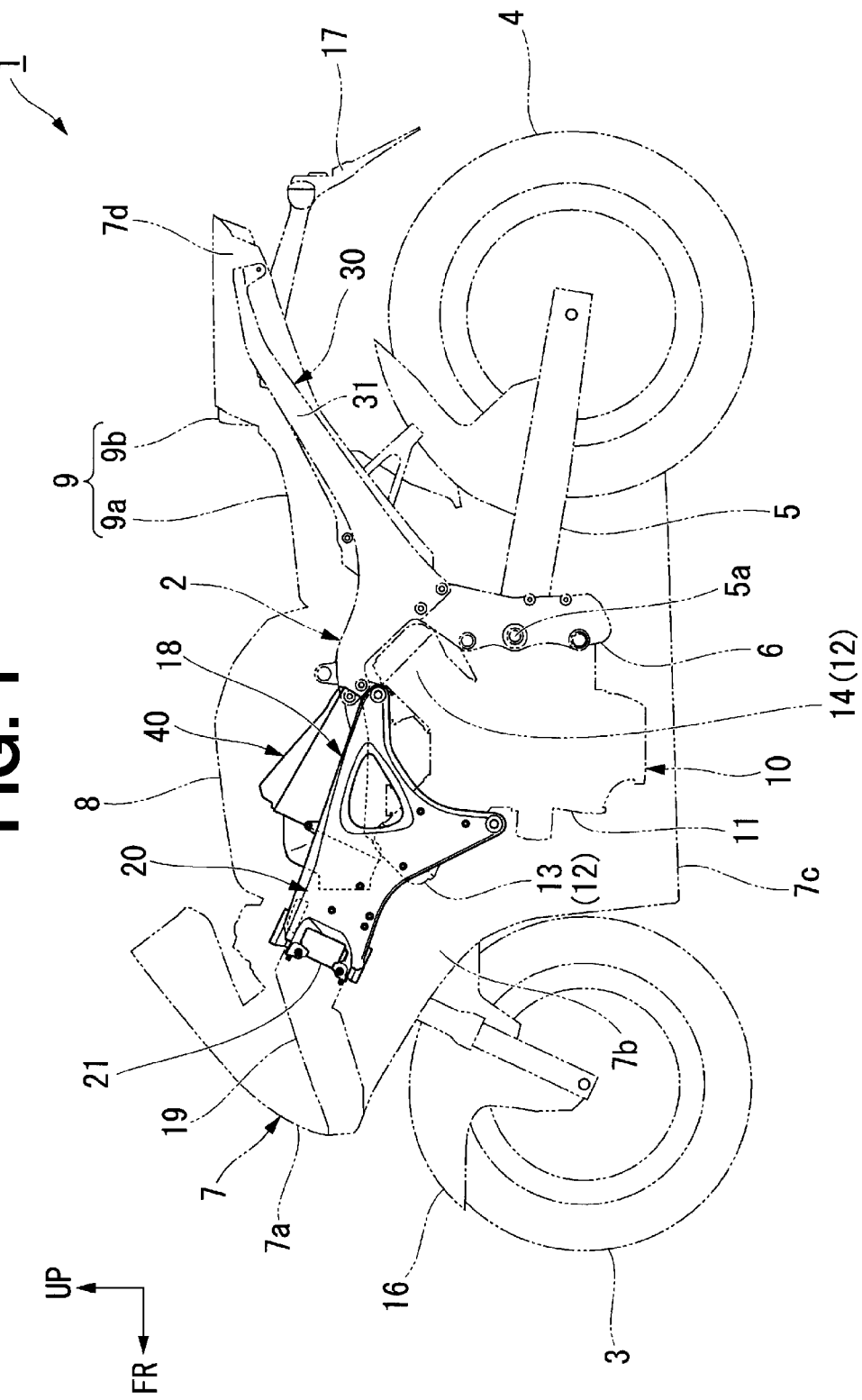
FIG. 1 is a left-side view of a motorcycle, as one type of saddle-ride vehicle, including a resonator structure according to an exemplary embodiment of the present invention.

An exemplary embodiment of the present invention will be described below with reference to the drawings. Note that in descriptions below, directions such as front, rear, left, and right are identical to those directions of a vehicle described below unless otherwise noted. In addition, the drawings used for the descriptions below include an arrow FR indicating the vehicle front direction, an arrow LH indicating the vehicle left direction, an arrow UP indicating the vehicle upper direction, and a vehicle lateral center line CL at appropriate positions in the drawings.

<Entire Vehicle> FIG. 1 illustrates a motorcycle 1 as an example of a saddle-ride vehicle. Referring to FIG. 1, the motorcycle 1 includes a front wheel 3 steered by a handlebar (not illustrated), and a rear wheel 4 driven by a power unit 10 including a V-type four-cylinder engine. Hereinafter, the motorcycle may be simply referred to as a "vehicle."

Parts for a steering system including the handlebar and the front wheel 3 are pivotally supported to be steerable by a head pipe 21 formed at a front end of a vehicle body frame 2 (specifically, the inside of a head box 20 provided at the front end of the vehicle body frame 2). In the head pipe 21, a handlebar steering shaft (not illustrated) connected to the handlebar is inserted. The head pipe 21 has a cylindrical shape forming a handlebar steering axis C1 (see FIG. 2), which is a center axis of the handlebar steering shaft. The power unit 10 is disposed at the center in the front-rear direction of the vehicle body frame 2. At a rear portion of the power unit 10, a pair of left and right swingarms 5 is pivotally supported to be swingable in the vertical direction about a pivot axis 5a. Between front portions of the left and right swingarms 5 and a rear portion of the vehicle body frame 2, rear suspensions (not illustrated) are disposed.

For example, the vehicle body frame 2 is formed by integrally joining several types of steel materials by welding or another technique. The vehicle body frame 2 includes: a main frame 18 having a pair of left and right front side frames 22L and 22R that first extend rearward and downward from the head box 20 having the head pipe 21 and then extend diverging with one rearward and the other downward; a seat rail 30 having a pair of left and right rear side frames 31 which include front ends connected to rear ends of the main frame 18 and rear ends joined to each other, and which first extend rearward and downward from the front ends thereof and then extend rearward and upward; and a pair of left and right pivot plates 6 connected to front lower ends of the left and right rear side frames 31 and extend downward.

The vehicle body frame 2 is divided into the main frame 18 as a vehicle front frame including the head box 20, the seat rail 30 as a vehicle rear frame, and the left and right pivot plates 6 as vehicle lower frames. The vehicle body frame 2 is integrated into a body by fastening and fixing the main frame 18 and the seat rail 30 with fasteners such as bolts as well as by fastening and fixing the seat rail 30 and the left and right pivot plates 6 with the fasteners such as bolts.

The power unit 10 is fixed to the pair of left and right pivot plates 6 as well as the rear ends and lower ends of the main frame 18. The power unit 10 includes a crankcase 11 and a cylinder portion 12 arranged at an upper portion of the crankcase 11 and having a V shape in a side view.

The cylinder portion 12 includes a front cylinder 13 and a rear cylinder 14 that are disposed with an interval in the front-rear direction. The front cylinder 13 protrudes forward and upward from the upper portion of the crankcase 11 and the rear cylinder 14 protrudes rearward and upward from the upper portion of the crankcase 11.

Above the power unit 10, a throttle body 15 (see FIG. 5) connected to the front and rear cylinders 13 and 14 is provided for adjusting an intake amount. An air cleaner box 40 that supplies intake air to the power unit 10 is connected to the head box 20. The air cleaner box 40 purifies the intake air supplied to the throttle body 15.

An exhaust pipe (not illustrated) is connected to the front cylinder 13. The exhaust pipe extends below the power unit 10 and is connected to a muffler (not illustrated) that is disposed at a right side of the rear wheel 4 and obliquely extends rearward and upward. A fuel tank 8 is disposed above the cylinder portion 12 and between frames of the main frame 18 in the vehicle width direction (specifically, between the left and right front side frames 22L and 22R in the vehicle width direction illustrated in FIG. 3). A seat 9 is disposed at the rear of the fuel tank 8 and on the seat rail 30. The seat 9 includes a seating portion 9a where the driver sits and a back pad 9b. Note that although the seat 9 is for a single occupant in the present embodiment, a tandem seat may be provided instead.

The vehicle body frame 2 is covered with a vehicle body cover 7. The vehicle body cover 7 includes a front cowl 7a for covering the front portion of the vehicle body frame 2, a front side cowl 7b for covering sides of the front portion of the vehicle body frame 2, an under cowl 7c for covering the lower portion of the vehicle body frame 2, and a rear cowl 7d for covering the rear portion of the vehicle body frame 2. Note that reference numerals 16 and 17 in FIG. 1 indicate a front fender and a rear fender, respectively.

Figure 2:
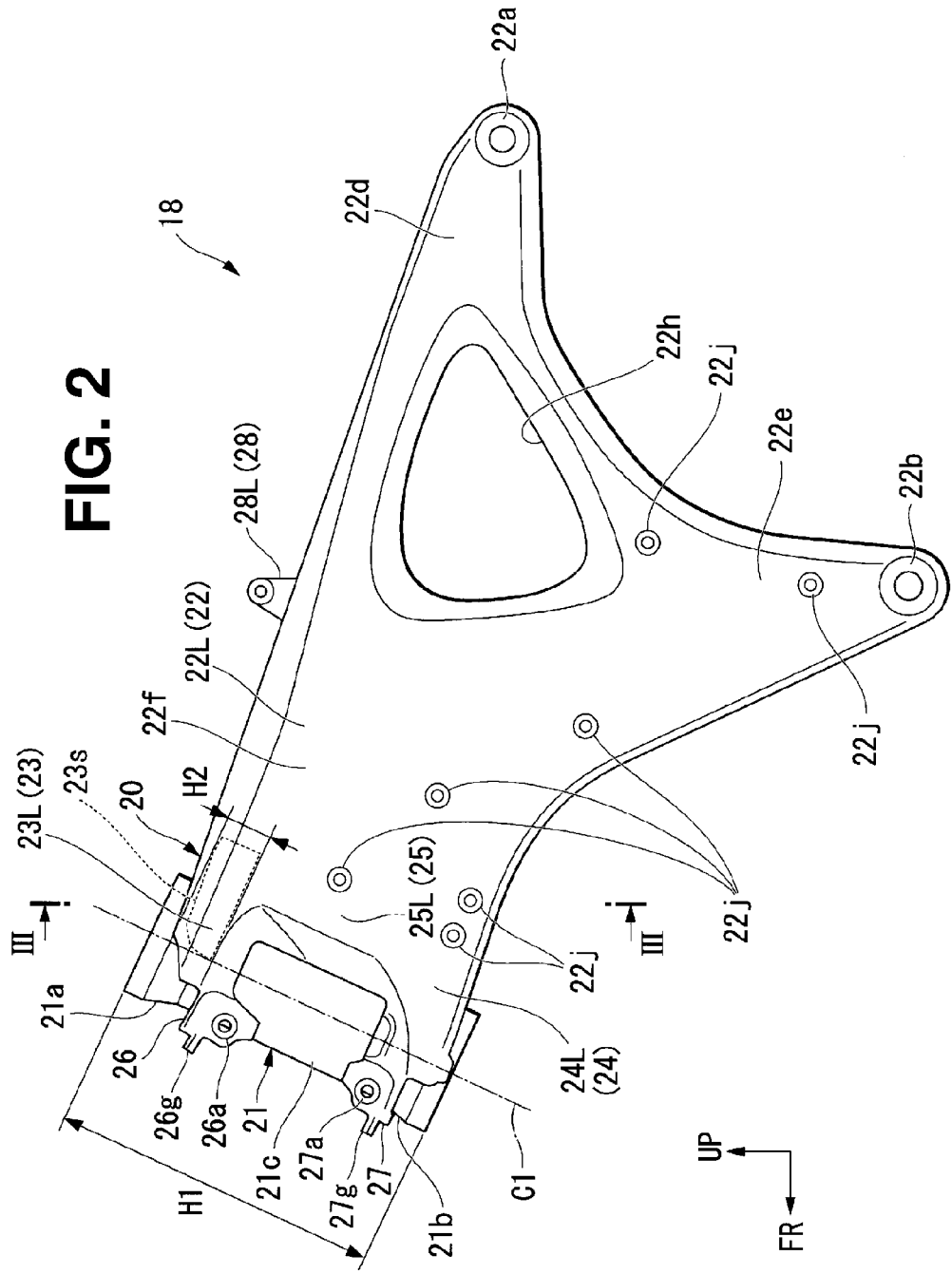
FIG. 2 is a left-side view of a main frame including a head box of the motorcycle of FIG. 1.
Figure 3:
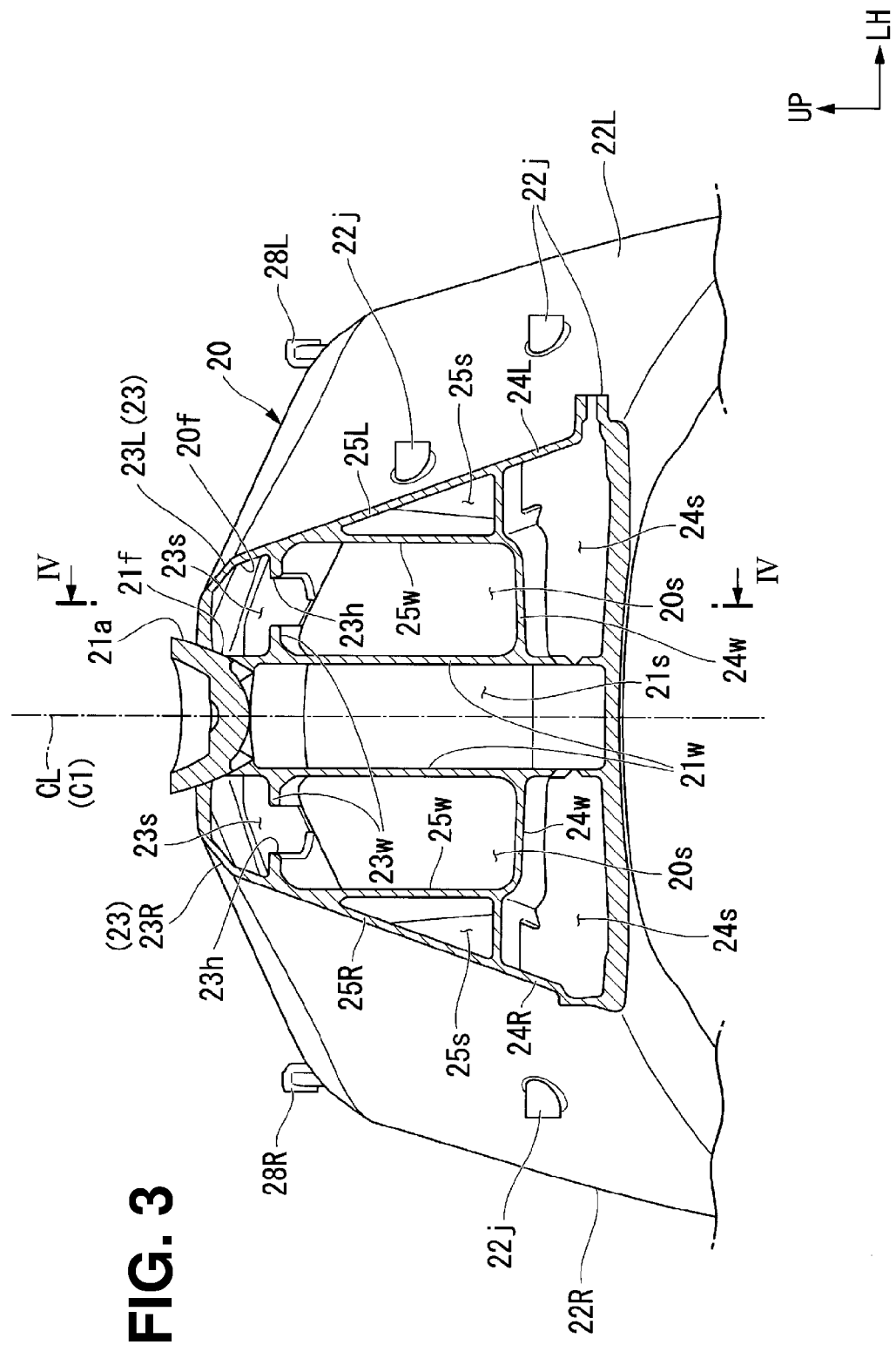
FIG. 3 is a front view of the head box including a partial cross-section along a line in FIG. 2.
Figure 4:
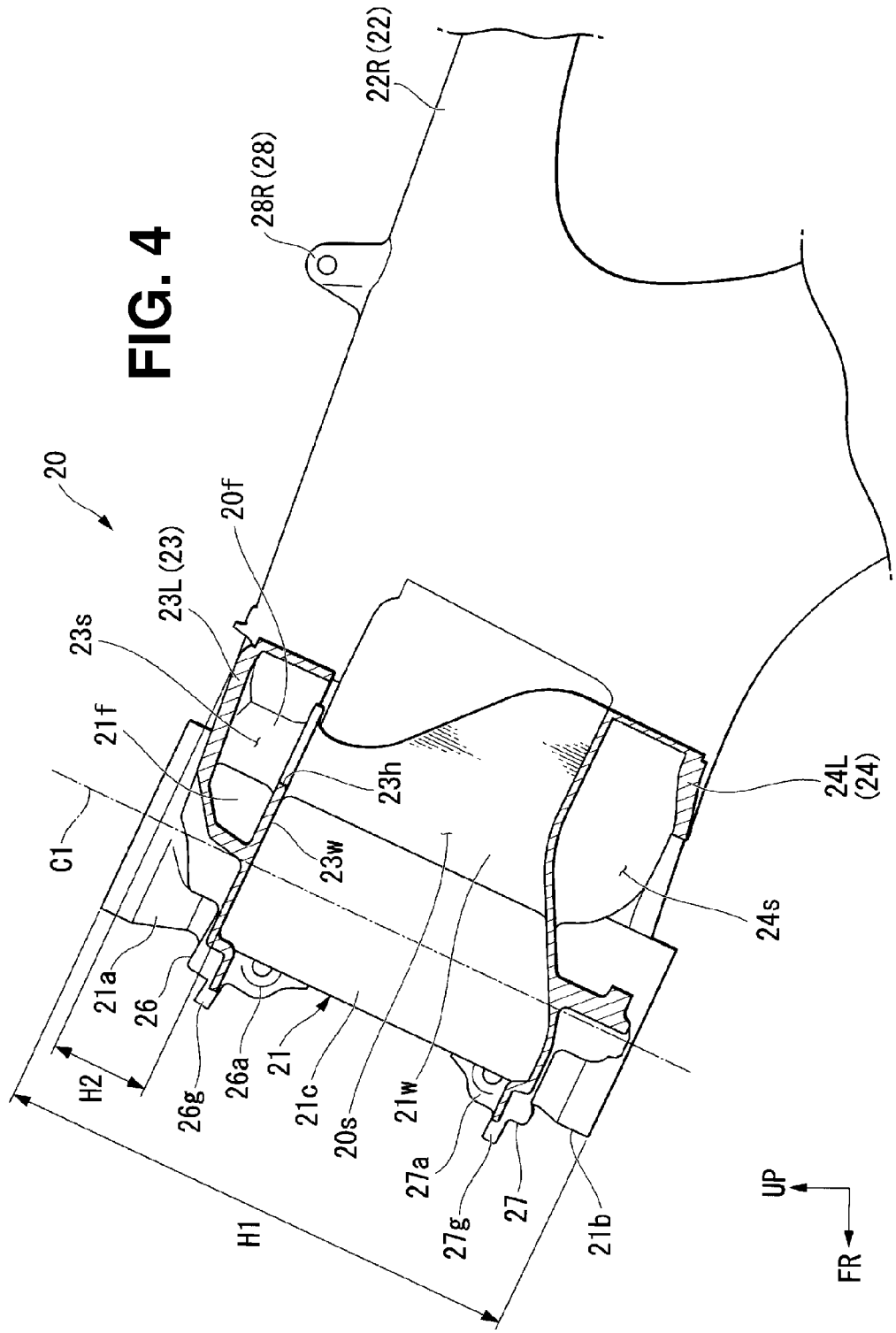
FIG. 4 is a side view including a partial cross-section taken along a line IV-IV in FIG. 3.
Figure 8:
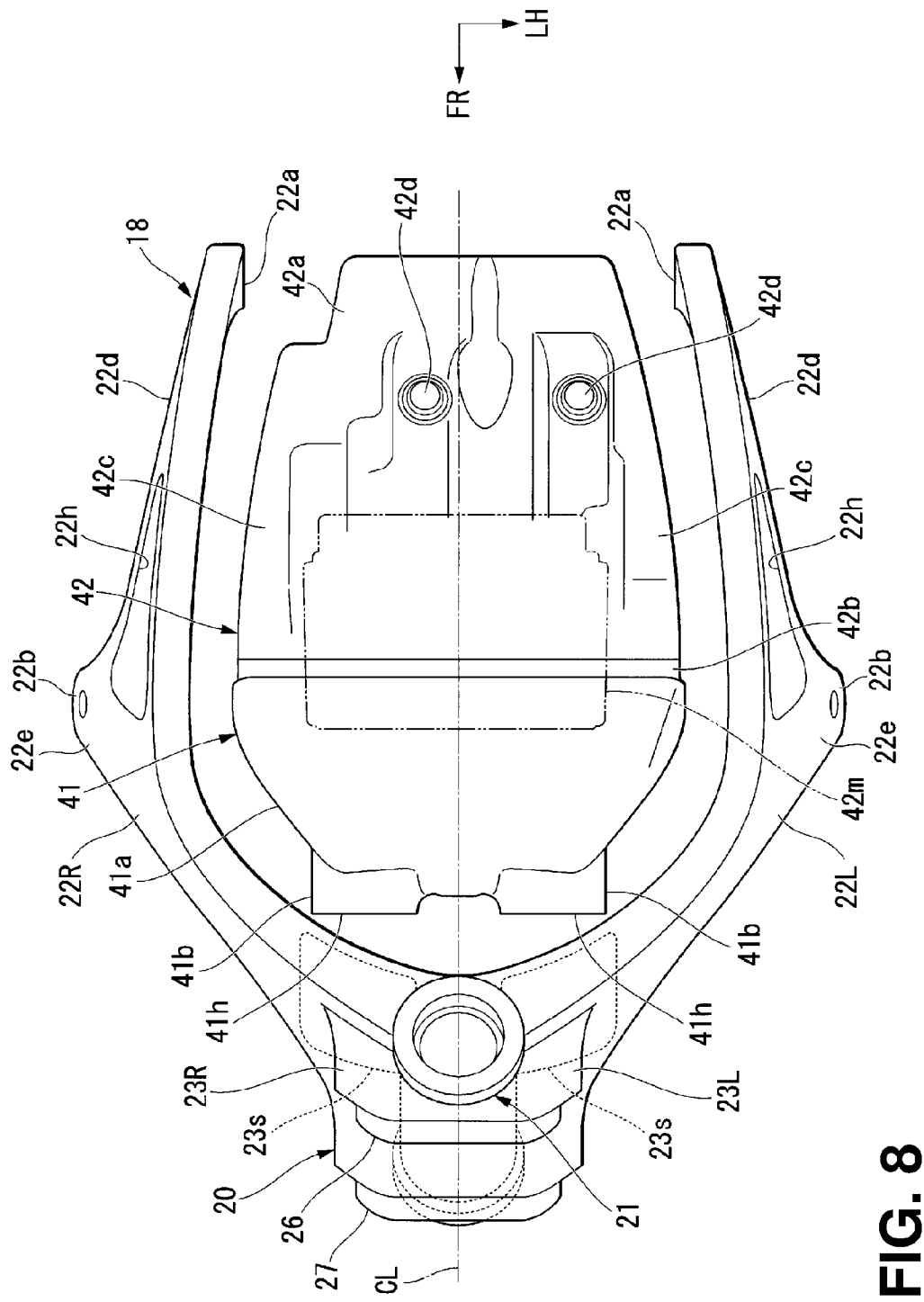
FIG. 8 is a top view showing the air cleaner box with the main frame of the motorcycle in FIG. 1.

<Head box> Referring to FIGS. 2 to 4 together, the head box 20 forms intake passages 20s directing air from the front of the vehicle into the inside when the vehicle is travelling. In a side view in FIG. 2, the head box 20 forms the head pipe 21 inclined rearward with respect to the vehicle vertical direction in the side view and forms the intake passages 20s at sides of the head pipe 21. A rear end of the head box 20 is connected to the pair of left and right front side frames 22 that first extend rearward and downward from the head pipe 21 and then extend diverging with one rearward and the other downward. Referring to FIG. 8 in addition, the front side frames 22 are formed to diverge in the left and right directions from the head pipe 21 in a top view. In the top view, the left and right front side frames 22 first extend from the head pipe 21 curving to extend outward in the vehicle width direction toward the rear sides, next bend rearward, and then extend gradually curving to extend inward in the vehicle width direction toward the rear sides. The reference numerals 22L and 22R in the drawings indicate the left front side frame and the right front side frame, respectively.

Referring to FIG. 2, an upper pipe portion 21a, which has a cylindrical shape that extends such that the diameter increases toward an upper side thereof and then forms an annular circular portion, is formed on an upper end of the head pipe 21. A lower pipe portion 21b, which extends such that the diameter increases toward a lower side thereof and then forms an annular circular portion, is formed on a lower end of the head pipe 21. A lower end of the upper pipe portion 21a and an upper end of the lower pipe portion 21b are respectively connected to an upper end and a lower end of a cylindrical head pipe main body 21c, which forms the handlebar steering axis C1.

In the side view in FIG. 2, each of the left and right front side frames 22L and 22R has a rear extension 22d that extends rearward such that the vertical width thereof shortens toward the rear side. Referring to FIGS. 1 and 2 together, a first support 22a, which supports the front upper portion of the rear cylinder 14, is formed at the tip (rear end) of the rear extension 22d.

In the side view in FIG. 2, each of the left and right front side frames 22L and 22R has a lower extension 22e that extends downward such that the front-rear width thereof shortens toward the lower side. Referring to FIGS. 1 and 2 together, a second support 22b, which supports a front lower portion of the front cylinder 13 and a front upper portion of the crankcase 11, is formed at the tip (lower end) of the lower extension 22e.

In the side view in FIG. 2, each of the left and right front side frames 22L and 22R has a front extension 22f that extends frontward and upward while keeping substantially the same vertical width. The tip (front end) of the front extension 22f joins to the rear portion of the head pipe 21. The tip of the front extension 22f includes a first circular portion 26 that has an annular shape joined to the upper end of the head pipe 21 (specifically, a lower portion of the upper pipe portion 21a and the upper end of the head pipe main body 21c) while circumferentially surrounding the head pipe 21, as well as a second circular portion 27 that has an annular shape joined to the lower end of the head pipe 21 (specifically, an upper portion of the lower pipe portion 21b and the lower end of the head pipe main body 21c) while circumferentially surrounding the head pipe 21.

Referring to FIGS. 2 and 4 together, flanges 26g and 27g, which protrude outward in the radial direction, are formed at the first and second circular portions 26 and 27, respectively. Thereby, it is possible to enhance rigidities of the first and second circular portions 26 and 27. Note that each of reference numerals 26a and 27a in the drawings indicates a stay mounting portions for attaching a stay that supports a vehicle part for the front of the vehicle such as the front cowl 7a (see FIG. 1).

In the side view in FIG. 2, an upper end edge of each of the left and right front side frames 22L and 22R (specifically, an upper end edge of the front extension 22f and an upper end edge of the rear extension 22d) linearly extends to gradually incline rearward and downward. In the side view in FIG. 2, a front lower end edge of each of the left and right front side frames 22L and 22R (specifically, a lower end edge of the front extension 22f and a front end edge of the lower extension 22e) curves to form a convex facing rearward and upward.

At a rear portion of each of the left and right front side frames 22L and 22R, an opening 22h that opens in the vehicle width direction is formed. The opening 22h is a through hole that passes through the rear portion of corresponding front side frame in the vehicle width direction. In the side view in FIG. 2, the opening 22h has a triangle shape having rounded corners and has a convex portion pointing the first support 22a. This makes it possible to reduce the weight of the left and right front side frames 22L and 22R while keeping rigidities thereof.

Figure 10:
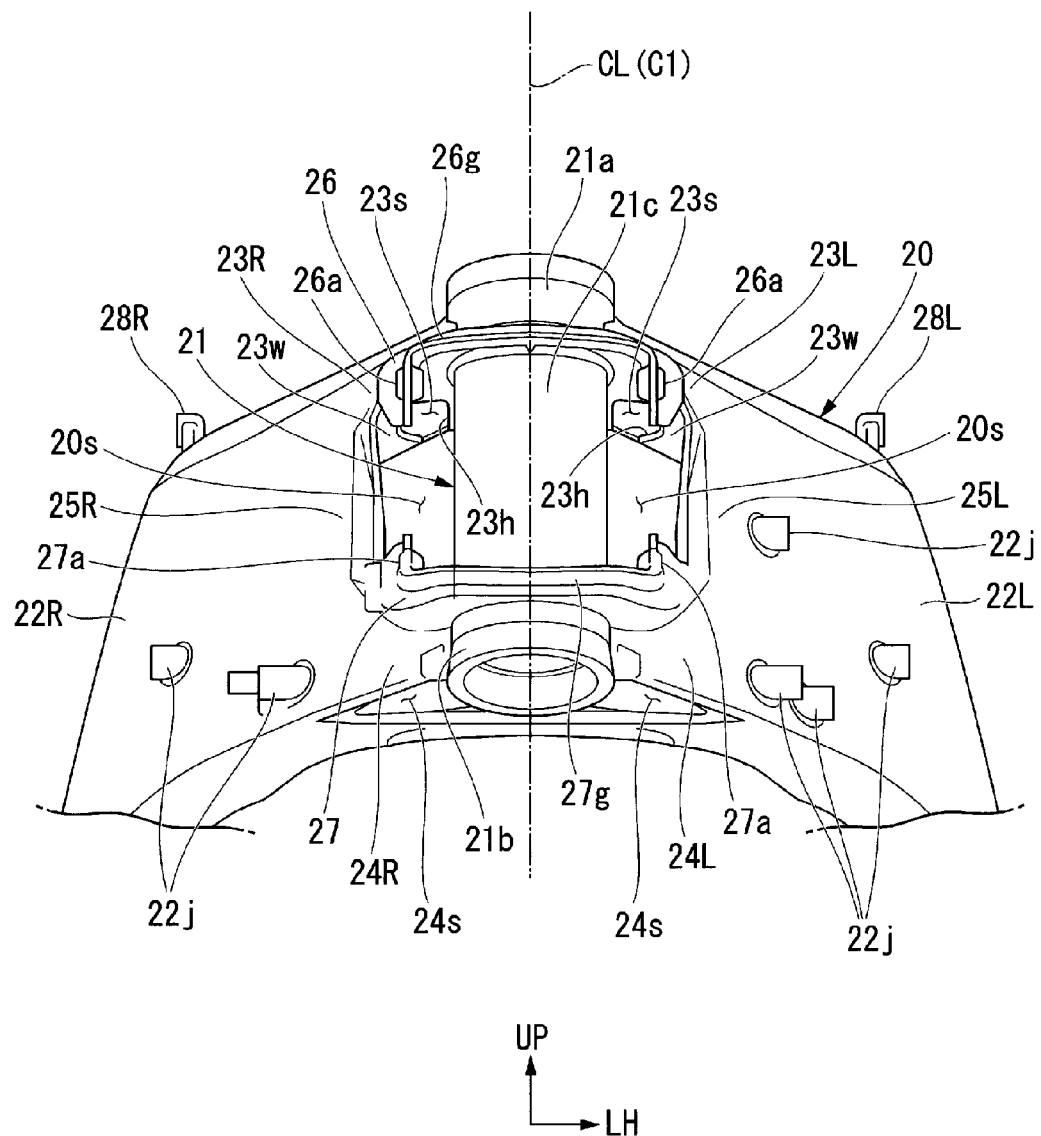
FIG. 10 is a front view of the head box.

In front views in FIGS. 3 and 10, outer walls on the outsides of the left and right front side frames 22L and 22R in the vehicle width direction incline inward in the vehicle width direction toward an upper side. On the outer walls of the left and right front side frames 22L and 22R, mounting bosses 22j are formed for attaching vehicle parts at the sides of the vehicle front portion such as the front side cowl 7b (see FIG. 1). The multiple (in the present embodiment, seven on the left front side frame 22L illustrated in FIG. 2) mounting bosses 22j, which protrude outward in the vehicle width direction from the outer walls of the left and right front side frames 22L and 22R, are disposed with intervals in the front-rear and up-down direction. Incidentally, in FIG. 8, the illustration of the mounting bosses 22j is omitted for convenience.

On upper ends of the left and right front side frames 22L and 22R, mounting protrusions 28 are formed protruding upward for attaching vehicle parts at a vehicle front upper side, such as the fuel tank 8 (see FIG. 1). Note that a reference numeral 28L in the drawings indicates a left mounting protrusion formed at the center in the front-rear direction of the upper end of the left front side frame 22L, and a reference numeral 28R in the drawings indicates a right mounting protrusion formed at the center in the front-rear direction of the upper end of the right front side frame 22R, respectively. Incidentally, in FIG. 8, the illustration of the left and right mounting protrusions 28L and 28R is omitted for convenience.

<Resonator> Referring to FIG. 2, in a vicinity of the head pipe 21 in the head box 20 (specifically, a part of the front extension 22f of the left and right front side frames 22L and 22R, which is adjacent to the head pipe 21), resonators 23 that form resonator chambers 23s reducing the intake noise, first volume portions 24 that form first volume chambers 24s, and second volume portions 25 that form second volume chambers 25s are formed. The resonators 23, the first volume portions 24, and the second volume portions 25 are arranged side by side along the handlebar steering axis C1. Referring to FIG. 3, in the head box 20, partitions 24w that extend in the vehicle width direction are provided between the first volume chambers 24s and the intake passages 20s to separate the first volume chambers 24s and the intake passages 20s. In addition, in the head box 20, partitions 25w that extend in the vertical direction are provided between the second volume chambers 25s and the intake passages 20s to separate the second volume chambers 25s and the intake passages 20s.

Referring to FIGS. 2 and 4 together, each of the resonators 23 is disposed at a position adjacent to the upper pipe portion 21a of the head pipe 21. Each of the first volume portions 24 is disposed at a position adjacent to the lower pipe portion 21b of the head pipe 21. At the sides of the head pipe main body 21c, each of the second volume portions 25 is disposed between the corresponding resonator 23 and first volume portion 24.

The resonators 23, the first volume portions 24, and the second volume portions 25 are integrally molded with the head box 20. In other words, the left and right front side frames 22L and 22R are integrally molded with the head box 20. For example, the head box 20 is integrally molded by forging using metals such as aluminum.

Referring to FIG. 2, in the direction along the handlebar steering axis C1, a distance between an upper end of the upper pipe portion 21a and a lower end of the lower pipe portion 21b in the head pipe 21 is referred to as an upper-lower length H1 of the head pipe 21. In addition, in the direction along the handlebar steering axis C1, a distance between a front upper end and a front lower end (a lower surface of a partition 23w in FIG. 4) of each resonator 23 is referred to as an upper-lower length H2 of the resonator 23. In the direction along the handlebar steering axis C1, the upper-lower length H2 of the resonator 23 is shorter than the upper-lower length H1 of the head pipe 21 (H2<H1). The resonator 23 is disposed at a space within the range of the upper-lower length H1 of the head pipe 21.

Referring to FIGS. 3 and 4 together, the resonator 23 forms an inner wall 20f of the head box 20 and an outer wall 21f of the head pipe 21. Specifically, the resonator 23 forms the inner wall 20f at a part of the front extension 22f of each of the left and right front side frames 22L and 22R, the part being adjacent to the head pipe 21, as well as the outer wall 21f at the upper pipe portion 21a of the head pipe 21.

Figure 11:
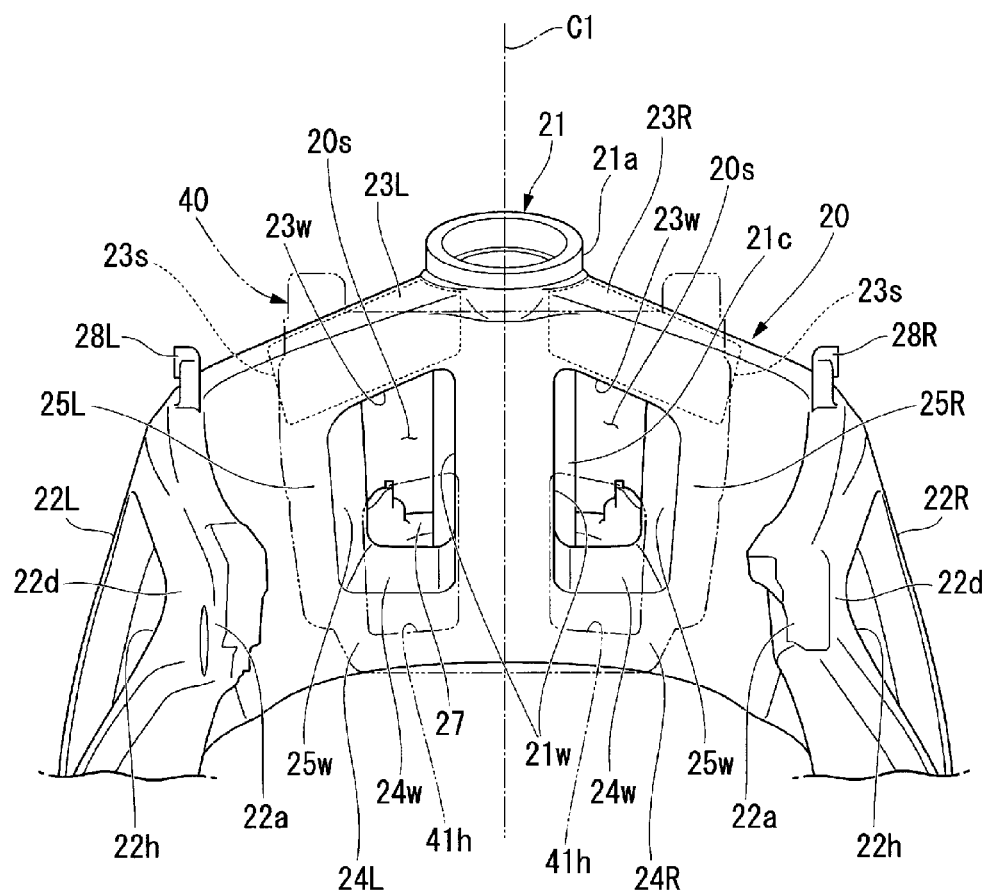
FIG. 11 is a rear side view showing the head box with the air cleaner box.

Referring to FIGS. 3, 10, and 11 together, the resonators 23, the first volume portions 24, and the second volume portions 25 are disposed at both left and right sides of the head box 20. Specifically, in the cross-sectional view in FIG. 3, the resonators 23, the first volume portions 24, and the second volume portions 25 are formed, one on each of the left and right sides of the vehicle lateral center line CL as a symmetry axis. In the cross-sectional view in FIG. 3, the resonators 23 and the first volume portions 24 have trapezoidal shapes while the second volume portions 25 have triangular shapes. Note that reference numerals 23L, 23R, 24L, 24R, 25L, and 25R in the drawings indicate a left resonator, a right resonator, a left first volume portion, a right first volume portion, a left second volume portion, and a right second volume portion, respectively.

Figure 9:
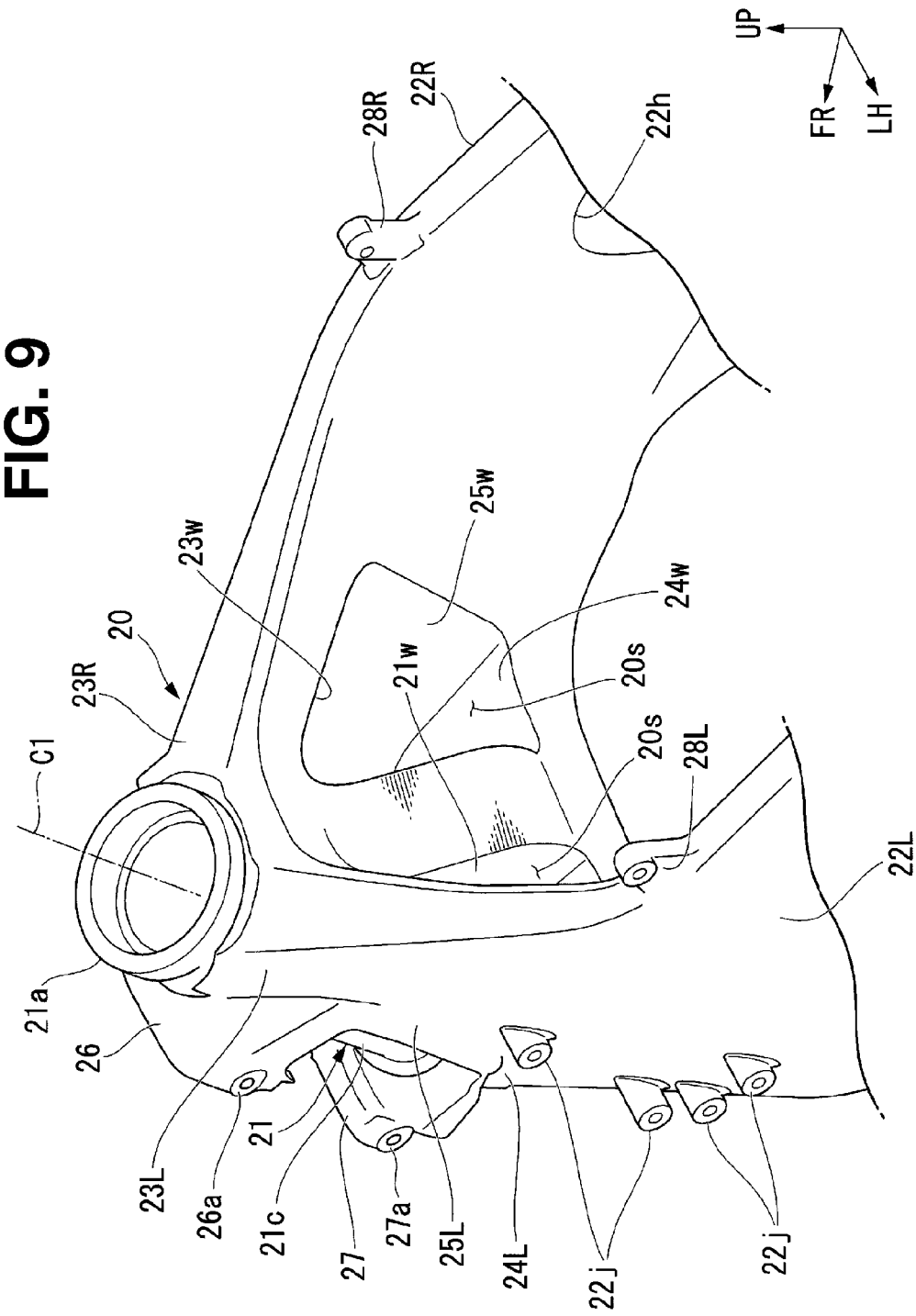
FIG. 9 is a perspective view of the head box seen from an upper-left-rear direction of the motorcycle in FIG. 1.

In the cross-sectional view in FIG. 3, inside the head box 20, the intake passages 20s are formed, one on each of the left and right sides of the vehicle lateral center line CL as the symmetry axis. In the cross-sectional view in FIG. 3, the intake passages 20s are formed by being surrounded by partitions (the resonators 23, the first volume portions 24, the second volume portions 25, and head pipe rear partitions 21w formed at a rear side of the head pipe 21) inside the head box 20. Referring to FIGS. 4 and 9 together, the rear end of each of the head pipe rear partitions 21w has a curved shape that curves and extends rearward toward the lower side. In the cross-sectional view in FIG. 3, each of the intake passages 20s has a rectangular shape that vertically extends. Note that a reference numeral 21s indicates a space surrounded by the rear portion of the head pipe 21 and the head pipe rear partitions 21w.

The resonator chambers 23s are formed inside the head box 20 in such a way as to continue to, or be continuous with, the intake passages 20s. The resonator chambers 23s are separately and independently formed on the left and right sides in the head box 20. Referring to FIG. 3, in the head box 20, partitions 23w that separate the resonator chambers 23s and the intake passages 20s are provided between the resonator chambers 23s and the intake passages 20s. Referring to FIG. 4, each of the partitions 23w has a thickness in the direction along the handlebar steering axis C1. In a rear side view in FIG. 11, the partition 23w inclines and extends from the upper end of the head pipe rear partition 21w downward toward the outside in the vehicle width direction, and then reaches an upper end of partitions 25w. Referring to FIGS. 3, 4, and 10 together, in the partition 23w, a communication hole 23h that opens in the direction along the handlebar steering axis C1 and communicates the resonator chamber 23s and the intake passage 20s is formed.

In the head box 20, no protrusion for forming the intake passages 20s and the resonator chambers 23s is formed to protrude toward the outside from an outer wall surface of the head box 20. In the present embodiment, the intake passages 20s and the resonator chambers 23s are formed inside the head box 20 without any such mentioned protrusion. For this reason, since a forming space for the intake passages 20s and the resonator chambers 23s does not need to be given outside the head box 20, size of the front portion of the vehicle body can be effectively reduced compared to the case where the intake passages 20s and the resonator chambers 23s would be formed inside the head box 20 having the above-mentioned protrusions.

Figure 5:
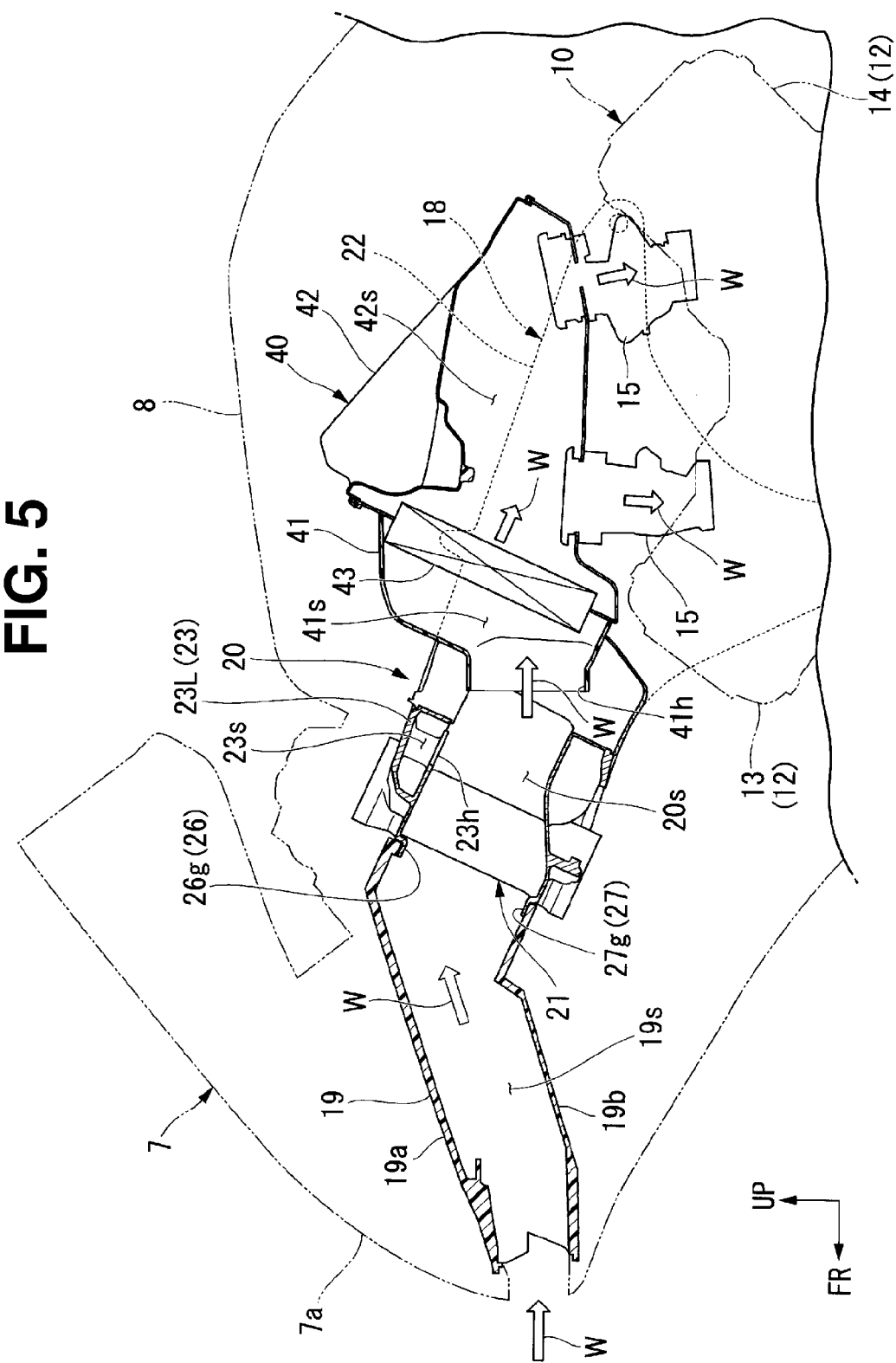
FIG. 5 is a diagram for describing an air intake pathway toward an engine of the motorcycle.
Figure 6:
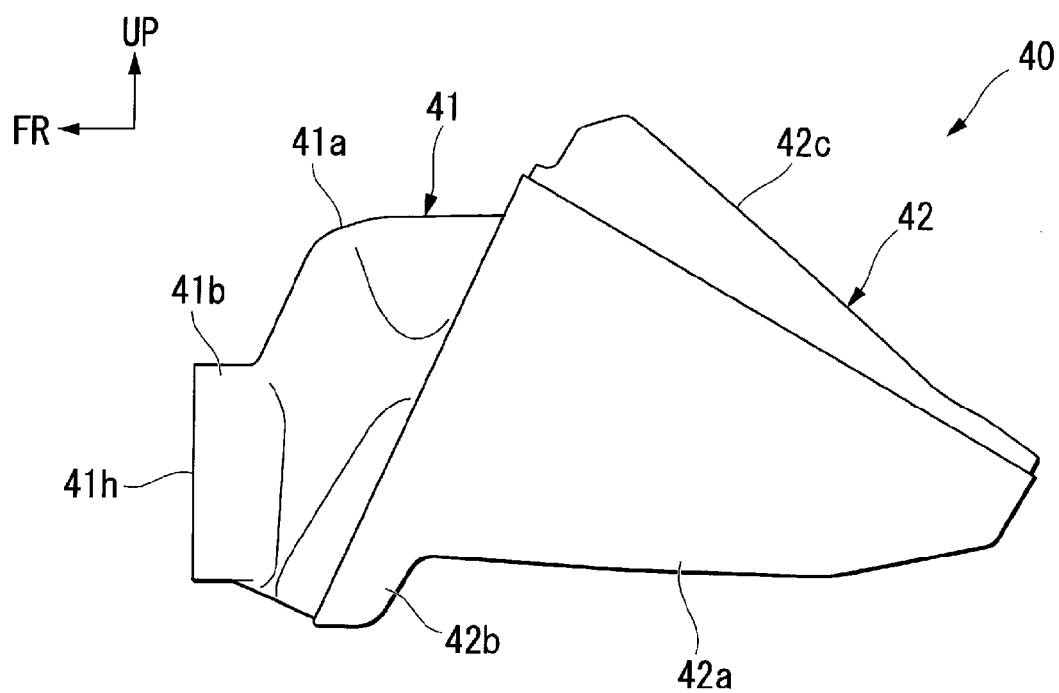
FIG. 6 is a left-side view of an air cleaner box of the motorcycle in FIG. 1.
Figure 7:
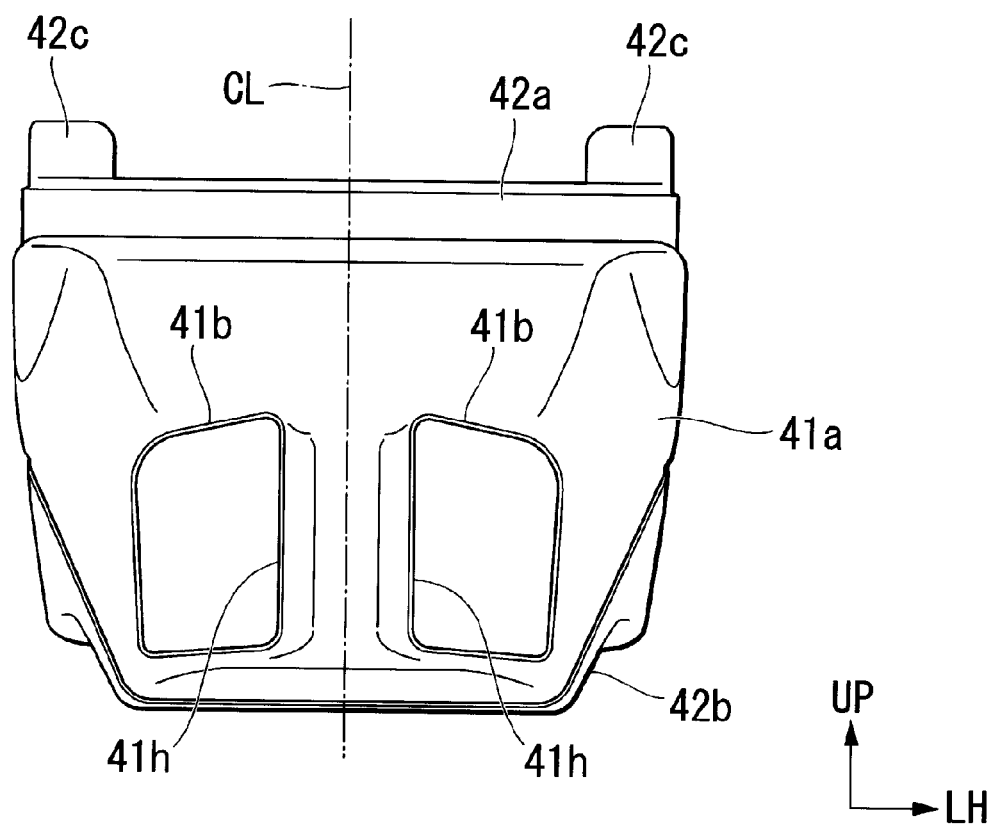
FIG. 7 is a front view of the air cleaner box.

<Air Cleaner Box> Referring to FIG. 5, the air cleaner box 40 is disposed at a rear side of the head box 20. Referring to FIGS. 6 to 8 together, the air cleaner box 40 is formed in a box shape having rounded corners. The air cleaner box 40 includes an intake 41 provided with a pair of left and right intake holes 41h at a front portion thereof, a main body portion 42 provided at a rear side of the intake 41, and an air cleaner element 43 (see FIG. 5) that is provided inside the air cleaner box 40 and at a connection between the intake 41 and the main body portion 42.

The intake 41 includes an intake main body 41a that has a trapezoidal shape in a front view in FIG. 7 and has a box shape extending such that a left-right width thereof becomes shorter toward a front side thereof in the top view in FIG. 8, and an intake hole forming portion 41b that protrudes frontward from a front lower portion of the intake main body 41a and forms the intake holes 41h. In the front view in FIG. 7, the intake holes 41h are formed, one on each of the left and right sides of the vehicle lateral center line CL as the symmetry axis. In the front view in FIG. 7, each of the pair of left and right intake holes 41h has a rectangular shape extending vertically. Referring to FIG. 5, each of the pair of left and right intake holes 41h is disposed rearward and downward of the corresponding communication hole 23h. In the rear side view in FIG. 11, the pair of left and right intake holes 41h are disposed to overlap the pair of left and right intake passages 20s, respectively.

The main body portion 42 includes an air cleaner box main body 42a that has a box shape extending such that the vertical width thereof becomes shorter toward a rear side thereof in a side view in FIG. 6, and has a trapezoidal shape having rounded corners in the top view in FIG. 8, an intake connection 42b positioned at a front side of the air cleaner box main body 42a and connects a rear portion of the intake 41 and the air cleaner box main body 42a, and projecting portions 42c that protrude upward from a top surface of the air cleaner box main body 42a and extend in the front-rear direction in such a way as to incline rearward and downward. Referring to FIG. 7, the projecting portions 42c are formed, one on each of the left and right sides of the vehicle lateral center line CL as the symmetry axis. Referring to FIG. 8, a space 42m in which vehicle parts such as an engine control unit (ECU) (not illustrated) can be mounted is formed between the pair of left and right projecting portions 42c.

Referring to FIG. 8, the air cleaner box 40 is disposed between the left and right front side frames 22L and 22R, which are the left and right side portions of the main frame 18. On the top surface of the air cleaner box main body 42a, bosses 42d that have cylindrical shapes and protrude upward are formed. The multiple (for example, in the present embodiment, a total of two, that is, one of the bosses 42d is on the left side while another boss 42b is on the right side, with the vehicle lateral center line CL in between) bosses 42d are formed at the rear of the space 42m. Thereby, it is possible to enhance a rigidity of the air cleaner box main body 42a while securing an installing space for the vehicle parts.

Referring to FIG. 5, an inside space of the air cleaner box 40 is separated into a dirty side 41s in the intake 41 and a clean side 42s in the main body portion 42 by the air cleaner element 43. The dirty side 41s is positioned at an upstream side of the air cleaner element 43, and the clean side 42s is positioned at a downstream side of the air cleaner element 43.

<Front Side Intake Passage> Referring to FIG. 5, inside the front portion of the vehicle, a front side intake passage forming portion 19 that forms a front side intake passage 19s is provided for directing air from the front of the vehicle inward. The front side intake passage forming portion 19 is disposed at a space surrounded by the front cowl 7a. The front side intake passage forming portion 19 first extends and inclines such that a rear side thereof is positioned upward, bends rearward and downward, and then extends to reach a front edge of the head box 20. Specifically, an upper wall 19a of the front side intake passage forming portion 19 first extends and inclines such that a rear side thereof is positioned upward, bends rearward and downward, and then extends to reach the flange 26g of the first circular portion 26. On the other hand, a lower wall 19b of the front side intake passage forming portion 19 first extends rearward, further extends and inclines such that a rear side thereof is positioned upward, next bends rearward and upward, after that bends rearward and downward, and then extends to reach the flange 27g of the second circular portion 27.

<Intake Pathway> Referring to FIG. 5, the fresh air taken from the outside into the front side intake passage 19s passes through the front side intake passage 19s and the intake passage 20s, and then the air is taken into the intake 41 through the intake holes 41h. The fresh air taken into the dirty side 41s in the intake 41 first passes through the air cleaner element 43 from a front side to a rear side thereof. Next, the air is filtered and reaches the clean side 42s. After that, the air passes the throttle body 15 and the like. Finally, the air is taken into the cylinder 12. A reference numeral W in the drawings indicates a flow of the intake air.

As described above, in the above embodiment, a resonator structure of the saddle-ride vehicle includes: the head box 20 that has the head pipe 21 forming the handlebar steering axis C1 and forms the intake passage 20s through which air is taken from the front of the vehicle into the inside of the vehicle when the vehicle is travelling; the air cleaner box 40 that is connected to the head box 20 and allows the air to be taken into the power unit 10 of the vehicle; and the resonator 23 that forms the resonator chamber 23s configured to reduce the intake noise, wherein the resonator chamber 23s is formed inside the head box 20 in such a way as to continue to, or be continuous with, the intake passage 20s.

According to this configuration, since the resonator chamber 23s is formed inside the head box 20 in such a way as to continue to the intake passage 20s, it is possible to effectively use the space inside the main frame 18. Thus, since there is no need to reserve a space for disposing the resonator 23 outside the head box 20, the size of the front portion of the vehicle body can be reduced unlike the case where the resonator 23 is disposed outside the head box 20. In addition, it is easier to secure a volume of the resonator 23 according to the structure of the present invention than in the case where the resonator 23 is disposed outside the head box 20, and it is easier to obtain a sufficient silencing effect of the resonator 23. Accordingly, it is possible to reduce the size of the front portion of the vehicle body while enhancing the silencing effect of the resonator 23.

In the above embodiment, the resonator 23 is integrally molded with the head box 20 as a single member. Thus, compared to the case where the resonator 23 is molded separately from the head box 20 (for example, the case where the resonator 23 is mechanically joined to the head box 20), the resonator 23 and head box 20 can be joined seamlessly and the joining or interface surface (surface) therebetween becomes smooth. For this reason, the resonator chamber 23s can be formed accurately inside the head box 20. For example, in a case where the head box 20 is molded by forging using a metal such as aluminum, any unnecessary portion such as a burr is not formed with the head box, unlike a technique such as welding which would form such an unnecessary portion. Therefore, time and effort to remove the unnecessary portion can be eliminated. In addition, metal which is a material for forging has a lower thermal expansion rate than resin which is a material for blow molding. Therefore, it is comparatively easy to form the resonator chamber 23s accurately inside the head box 20.

In the above exemplary embodiment, the communication hole 23h through which the resonator chamber 23s and the intake passage 20s communicate is formed in the partition 23w. This enables smooth communication between the resonator chamber 23s and the intake passage 20s. Therefore, it is possible to prevent an intake resistance between the resonator chamber 23s and the intake passage 20s from increasing.

In the above embodiment, each of the pair of left and right intake holes 41h in the air cleaner box intake is disposed rearward of the communication hole 23h. Thus, the air filled in the resonator chamber 23s is smoothly guided into the air cleaner box 40 through the pair of left and right intake holes 41h. Therefore, the air can be supplied to the power unit 10 by effectively using the air passing through the resonator chamber 23s. Accordingly, it is possible to prevent the intake resistance from increasing at the moment the engine revolution shifts to a high revolution region.

In the above exemplary embodiment, the resonators 23 are disposed at each of the left and right sides of the head box 20. Thus, the resonator chambers 23s inside the head box 20 can have a larger volume than in the case where the resonator 23 is disposed at only one side, left or right, of the head box 20. Therefore, the silencing effect for the intake noise can be enhanced. In addition, a rigidity balance of the left and right main frames 18 including the head box 20 can be improved.

In the above exemplary embodiment, the upper-lower length H2 of the resonator 23 is shorter than, and encompassed within, the upper-lower length H1 of the head pipe 21 in the direction along the handlebar steering axis C1. Thus, it is possible to make a structure in which the resonator 23 does not protrude upward or downward from the head pipe 21. Thus, the resonator chamber 23s can be compactly formed inside the head box 20, and the size of the front portion of the vehicle body can be reduced.

In the above exemplary embodiment, the resonator 23 forms the inner wall 20f of the head box 20 and the outer wall 21f of the head pipe 21. Thus, the volume of the resonator chamber 23s can be increased as large as reasonably possible without increasing the size of the head box, and the silencing effect for the intake noise can be enhanced.

It should be noted that, although in the above exemplary embodiment, the descriptions have been provided for the example in which the left and right front side frames 22L and 22R are integrally molded with the head box 20, the invention is not limited thereto. For example, the left and right front side frames 22L and 22R may be molded separately from the head box 20 and joined thereto. Specifically, the left and right front side frames 22L and 22R may be joined mechanically with the head box 20.

Although in the above exemplary embodiment, the descriptions have been provided for the example in which the pair of left and right intake holes 41h are disposed at the rear lower sides of the communication holes 23h, the invention is not limited thereto. For example, the pair of left and right intake holes 41h may be arranged at the rear upper sides of the communication holes 23h. In other words, the pair of left and right intake holes 41h may be arranged at the rear sides of the communication holes 23h.

Although in the above exemplary embodiment, the descriptions have been provided for the example in which the resonators 23 are arranged at both left and right sides of the head box 20, the invention is not limited thereto. For example, the resonator 23 may be arranged at only one side, left or right, of the head box 20.

Although in the above exemplary embodiment, the descriptions have been provided for the example in which the upper-lower length H2 of the resonator 23 is shorter than the upper-lower length H1 of the head pipe 21 in the direction along the handlebar steering axis C1, the invention is not limited thereto. For example, the upper-lower length H2 of the resonator 23 may be longer than or equal to the upper-lower length H1 of the head pipe 21M the direction along the handlebar steering axis C1.

Although in the above embodiment, the descriptions have been provided for the example in which the resonator 23 forms the inner wall 20f of the head box 20 and the outer wall 21f of the head pipe 21, the invention is not limited thereto. For example, the resonator 23 does not have to form the inner wall 20f of the head box 20 and the outer wall 21f of the head pipe 21.

Although in the above exemplary embodiment, the descriptions have been provided for the example in which multiple resonator chambers 23s are separately and independently formed at the left and right sides inside the head box 20, the invention is not limited thereto. For example, the left and right resonator chambers 23s may be formed to connect each other (as to be converged) inside the head box 20.

Although in the above exemplary embodiment, the descriptions have been provided for the example in which in the vicinity of the head pipe 21 in the head box 20, the resonator 23 forms the resonator chamber 23s and disposed at the position adjacent to the upper pipe portion 21a of the head pipe 21, the first volume portion 24 forms the first volume chamber 24s and disposed at the position adjacent to the lower pipe portion 21b of the head pipe 21, and the second volume portion 25 forms the second volume chamber 25s and disposed between the resonator 23 and the first volume chamber 24 at the side of the head pipe main body 21c, the invention is not limited thereto. For example, in addition to the resonator 23, at least one of the first volume portion 24 and the second volume portion 25 may be provided a function as a resonator. Thereby, compared to the case where the resonator 23 is disposed at only the position adjacent to the upper pipe portion 21a of the head pipe 21, the volume of the resonator chamber 23s inside the head box 20 can be increased. Therefore, the silencing effect for the intake noise can be enhanced.

Although in the above exemplary embodiment, the descriptions have been provided for the example in which the resonator 23 is formed in the vicinity of the head pipe 21 in the head box 20 (front upper portion of the head box 20), the invention is not limited thereto. For example, the resonator 23 may be formed at the upper portion of the center in the front-rear direction of the head box 20. In other words, the resonator 23 may be formed at the upper portion of the head box 20. In addition, the resonator 23 may be formed not at the top portion of the head box 20 but at the lower portion of the head box 20.

Although in the above exemplary embodiment, the descriptions have been provided for the example in which the vehicle body frame 2 is divided into the main frame 18 as the vehicle body front frame and the seat rail 30 as the vehicle body rear frame (divided into the front and the rear), the invention is not limited thereto. For example, the vehicle body frame 2 does not have to be divided in the front and the rear. In other words, the vehicle body frame 2 may be one body including the front and the rear.

Note that the present invention is not limited to the above exemplary embodiment, and, for example, the saddle-ride vehicle includes various kinds of vehicles that a driver rides astride of, such as not only motorcycles (including motor-assisted bicycles and scooter type vehicles) but also three-wheeled vehicles (including one front wheel and two rear wheels types as well as two front wheels and one rear wheel types). In addition, the present invention is applicable to not only motorcycles but also four-wheeled vehicles such as automobiles.

Although the engine in the exemplary embodiment is a V-type four-cylinder engine, the engine may be a two-cylinder engine or a six-cylinder engine, and the cylinder arrangements are not limited to the V-type and may be a horizontally-opposed cylinder type, for example. The engine does not need to be what is called a transverse engine, which is mounted such that a crankshaft is parallel to the vehicle width direction. The engine may be what is called a longitudinal engine, which is mounted such that the crankshaft is parallel to the vehicle front-rear direction, and the cylinder arrangement in this case may also include various types. In addition, the power unit 10 may be one that includes an electric motor in the drive source.

The structure in the above exemplary embodiment is an example of the present invention, and various modifications can be made without departing from the spirit of the present invention, such as replacing a constituent in the embodiment with a known equivalent constituent.

EXPLANATION OF THE REFERENCE NUMERALS

1 MOTORCYCLE (SADDLE-RIDE VEHICLE)
10 POWER UNIT
18 MAIN FRAME
20 HEAD BOX
20f INNER WALL
20s INTAKE PASSAGE
21 HEAD PIPE
21f OUTER WALL
23 RESONATOR
23h COMMUNICATION HOLE
23s RESONATOR CHAMBER
23w PARTITION
40 AIR CLEANER BOX
41h INTAKE HOLE
C1 HANDLEBAR STEERING AXIS
H1 UPPER-LOWER LENGTH OF HEAD PIPE
H2 UPPER-LOWER LENGTH OF RESONATOR

We claim:

1. A resonator structure of a saddle-ride vehicle comprising:
    a head box that includes a head pipe defining a handlebar steering axis and that forms an intake passage through which air is guided from a front of the vehicle into an inside of the vehicle when the vehicle is travelling;
    an air cleaner box that is connected to the head box and allows the air guided through the intake passage to be taken into a power unit of the vehicle; and
    a resonator that forms a resonator chamber configured to reduce an air intake noise,
    wherein the resonator chamber is formed continuous to the intake passage inside the head box and
    an upper-lower length of the resonator is shorter than an upper-lower length of the head pipe in a direction along the handlebar steering axis and
    the resonator extends rearward of the head pipe and below an upper surface of the head pipe.

2. The resonator structure of the saddle-ride vehicle according to claim 1, wherein the resonator is integrally molded with the head box as a single member.

3. The resonator structure of the saddle-ride vehicle according to claim 2, wherein the single member is a forged metal member.

4. The resonator structure of the saddle-ride vehicle according to claim 1,
    wherein the head box includes a partition between the resonator chamber and the intake passage so the partition separates the resonator chamber and the intake passage, and
    a communication hole through which the resonator chamber and the intake passage communicate is formed in the partition.

5. The resonator structure of the saddle-ride vehicle according to claim 4, wherein the air cleaner box is disposed at a rear side of the head box, an intake hole is provided at a front portion of the air cleaner box, and the intake hole is disposed rearward of the communication hole.

6. The resonator structure of the saddle-ride vehicle according to claim 1, wherein the resonator is symmetrically disposed at each of left and right sides of the head box.

7. The resonator structure of the saddle-ride vehicle according to claim 1,
    wherein the head box forms two of said intake passage through which air is guided from a front of the vehicle into an inside of the vehicle when the vehicle is traveling, said intake passages are disposed at each of left and right sides of the head box, two of said resonator are disposed at each of right and left sides within the head box, the resonators form respective ones of the resonator chamber which are continuous to respective ones of the intake passages inside the head box, and
    a pair of left and right intake holes are provided at the front portion of the air cleaner box and receive the air guided through respective ones of the intake passage.

8. The resonator structure of the saddle-ride vehicle according to claim 1, wherein the resonator forms an inner wall of the head box and an outer wall of the head pipe.

9. The resonator structure of the saddle-ride vehicle according to claim 1, wherein the resonator and a side frame of the saddle-ride vehicle are integrally molded with the head box.

10. A saddle-ride vehicle comprising:
    a head box that includes a head pipe defining a handlebar steering axis and that forms an intake passage through which air is guided from a front of the vehicle into an inside of the vehicle when the vehicle is travelling;
    an air cleaner box that is connected to the head box and allows the air guided through the intake passage to be taken into a power unit of the vehicle; and
    a resonator that forms a resonator chamber configured to reduce an air intake noise,
    wherein the resonator chamber is formed continuous to the intake passage inside the head box and
    an upper-lower length of the resonator is shorter than an upper-lower length of the head pipe in a direction along the handlebar steering axis, and the resonator extends rearward of the head pipe and below an upper surface of the head pipe.

11. The saddle-ride vehicle according to claim 10, wherein the resonator is integrally molded with the head box as a single member.

12. The saddle-ride vehicle according to claim 11, wherein the single member is a forged metal member.

13. The saddle-ride vehicle according to claim 10,
wherein the head box includes a partition between the resonator chamber and the intake passage so the partition separates the resonator chamber and the intake passage, and a communication hole through which the resonator chamber and the intake passage communicate is formed in the partition.

14. The saddle-ride vehicle according to claim 13, wherein the air cleaner box is disposed at a rear side of the head box, an intake hole is provided at a front portion of the air cleaner box, and the intake hole is disposed rearward of the communication hole.

15. The saddle-ride vehicle according to claim 10, wherein the resonator forms an inner wall of the head box and an outer wall of the head pipe.

16. The saddle-ride vehicle according to claim 10, wherein the vehicle further comprises a body frame including a main frame having a pair of left and right front side frames, and the resonator and the front side frames are integrally molded with the head box.

17. The saddle-ride vehicle according to claim 10, wherein the head box forms two of said intake passage through which air is guided from a front of the vehicle into an inside of the vehicle when the vehicle is traveling, said intake passages are disposed at each of left and right sides of the head box, two of said resonator are disposed at each of right and left sides within the head box, the resonators form respective ones of the resonator chamber which are continuous to respective ones of the intake passages inside the head box, and a pair of left and right intake holes are provided at the front portion of the air cleaner box and receive the air guided through respective ones of the intake passage.

* * * * *